(12) United States Patent
Sherkin et al.

(10) Patent No.: US 11,606,207 B2
(45) Date of Patent: *Mar. 14, 2023

(54) ERROR-CORRECTING KEY AGREEMENT FOR NOISY CRYPTOGRAPHIC SYSTEMS

(71) Applicant: DIGITAL 14 LLC, Abu Dhabi (AE)

(72) Inventors: Alexander Sherkin, Vaughan (CA); Milap Sheth, Kitchener (CA)

(73) Assignee: DIGITAL 14 LLC, Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,600

(22) Filed: Jan. 4, 2022

(65) Prior Publication Data

US 2022/0131694 A1 Apr. 28, 2022

Related U.S. Application Data

(63) Continuation of application No. 16/912,554, filed on Jun. 25, 2020, now Pat. No. 11,271,739.

(51) Int. Cl.
*H04L 9/30* (2006.01)
*H04L 9/32* (2006.01)
*H04L 9/08* (2006.01)
*H04L 9/14* (2006.01)
*H04L 9/40* (2022.01)

(52) U.S. Cl.
CPC .......... *H04L 9/3026* (2013.01); *H04L 9/0861* (2013.01); *H04L 9/14* (2013.01); *H04L 9/3242* (2013.01); *H04L 63/0442* (2013.01)

(58) Field of Classification Search
CPC ....... H04L 9/3026; H04L 9/0861; H04L 9/14; H04L 9/3242
See application file for complete search history.

(56) References Cited

U.S. PATENT DOCUMENTS

| | | | | |
|---|---|---|---|---|
| 6,477,254 | B1 * | 11/2002 | Miyazaki | H04L 9/085 380/283 |
| 10,862,688 | B2 * | 12/2020 | Velikevitch | H04L 9/0869 |
| 10,892,891 | B2 * | 1/2021 | Velikevitch | H04L 9/3242 |
| 2004/0037424 | A1 * | 2/2004 | Numao | H04L 9/083 380/277 |

(Continued)

FOREIGN PATENT DOCUMENTS

WO WO-2015004286 A1 * 1/2015 ........... H04L 9/0838

*Primary Examiner* — Darshan I Dhruv
(74) *Attorney, Agent, or Firm* — Zilka-Kotab, P.C.

(57) ABSTRACT

A system, method, and computer program product are provided for sending and receiving messages using a noisy cryptographic system. To send a message, N secret keys are negotiated using a noisy cryptographic system, where K secret keys are expected to be noiseless. A secret polynomial that includes the N secret keys is generated, and K points on the secret polynomial are derived. For each of the N secret keys, a secret key MAC key is derived and a secret key MAC is calculated using the derived secret key MAC key. A secret key MAC header is generated that includes an array of each of the secret key MACs and possibly a corresponding public key. Message integrity plaintext is generated that includes an encrypted message, the secret key MAC header, and an array of the K points on the secret polynomial. A final message that includes the message integrity plaintext is generated for being sent.

20 Claims, 8 Drawing Sheets

(56) References Cited

U.S. PATENT DOCUMENTS

| | | | |
|---|---|---|---|
| 2010/0169658 A1* | 7/2010 | Ghouti | H04L 9/0643 |
| | | | 713/181 |
| 2010/0211787 A1* | 8/2010 | Bukshpun | H04L 9/14 |
| | | | 380/255 |
| 2010/0217986 A1* | 8/2010 | Schneider | H04L 9/3242 |
| | | | 380/279 |
| 2014/0223192 A1* | 8/2014 | Dent | G06F 21/52 |
| | | | 713/189 |
| 2017/0070340 A1* | 3/2017 | Hibshoosh | H04L 9/3026 |
| 2017/0366354 A1* | 12/2017 | Alomair | H04L 9/3242 |
| 2019/0245682 A1* | 8/2019 | Alwen | H04L 63/0428 |
| 2019/0268149 A1* | 8/2019 | Kariv | H04L 9/0897 |
| 2020/0186356 A1* | 6/2020 | Veeningen | H04L 9/3218 |
| 2020/0295946 A1* | 9/2020 | Velikevitch | H04L 9/088 |
| 2020/0389306 A1* | 12/2020 | Dolan | H04L 9/3066 |

* cited by examiner

ERROR-CORRECTING KEY AGREEMENT FOR NOISY CRYPTOGRAPHIC SYSTEMS

RELATED APPLICATION(S)

This application is a continuation of U.S. patent application Ser. No. 16/912,554 filed Jun. 25, 2020, the entire contents of which are incorporated herein by reference.

FIELD OF THE INVENTION

The present invention relates to cryptographic systems, and in particular noisy cryptographic systems.

BACKGROUND

Cryptography is generally provided for enabling secure communications between senders and receives. In particular, cryptography is used to secure these communications from being accessed by unauthorized third parties. One type of cryptography involves the use of a key shared between a sender and a receiver, where the key is used to encrypt and decrypt the communications by the sender and receiver, respectively, thus preventing from third parties who do not have knowledge of the key from accessing the communication. This type of cryptography is also referred to as a key agreement algorithm.

Traditionally, use of a shared key, which is a secret between the sender and receiver, requires both the sender and receiver to perform error-free deterministic operations to derive the same key. However, when some key agreement mechanisms are used, the derived key may be slightly different on the two peers. Noisy cryptographic systems may be defined as cryptographic systems that negotiate keys that are different between the two parties statistically significantly. For example, this property may be a useful security property of a crypto system to prevent side-channel attacks that rely on deterministic properties of computation. Alternatively, crypto system noise may be an inherent property of certain useful crypto systems. Unfortunately, key agreement using a noisy cryptographic system does not inherently allow both the sender and receiver to share a common key, in particular due to the presence of noise.

For example, multiple secret keys may be negotiated using the noisy cryptographic system and integrity checks may also be sent for each of those keys. The receiver will choose the key for which integrity can be verified. However, the sender will not know which key passed verification for the receiver, and thus will not know which key should be used for protecting the message payload.

There is thus a need for addressing these and/or other issues associated with the prior art.

SUMMARY

A system, method, and computer program product are provided for sending and receiving messages using a noisy cryptographic system. To send a message, N secret keys are negotiated using a noisy cryptographic system, where K secret keys are expected to be noiseless. A secret polynomial that includes the N secret keys is generated, and K points on the secret polynomial are derived. For each of the N secret keys, a secret key MAC key is derived and a secret key MAC is calculated using the derived secret key MAC key. A secret key MAC header is generated that includes an array of each of the secret key MACs and a corresponding public key. Message integrity plaintext is generated that includes an encrypted message, the secret key MAC header, and an array of the K points on the secret polynomial. A final message that includes the message integrity plaintext is generated for being sent.

To receive a message encrypted using the noisy cryptographic system, N secret keys are negotiated using a noisy cryptographic system, wherein K secret keys of the N secret keys are expected to be noiseless. A final message having message integrity plaintext is received, the message integrity plaintext including: an encrypted message, a secret key MAC header that includes an array comprised of a secret key MAC and a corresponding public key for each of the N secret keys, and an array of K points on a secret polynomial. At least K secret key candidates are determined from the N secret keys, and the at least K secret key candidates are used to determine N coefficients for the secret polynomial. A key derivation function (KDF) is used on the N coefficients of the secret polynomial to derive a message encryption key, and the encrypted message is decrypted using the message encryption key.

DETAILED DESCRIPTION

Figure 1:
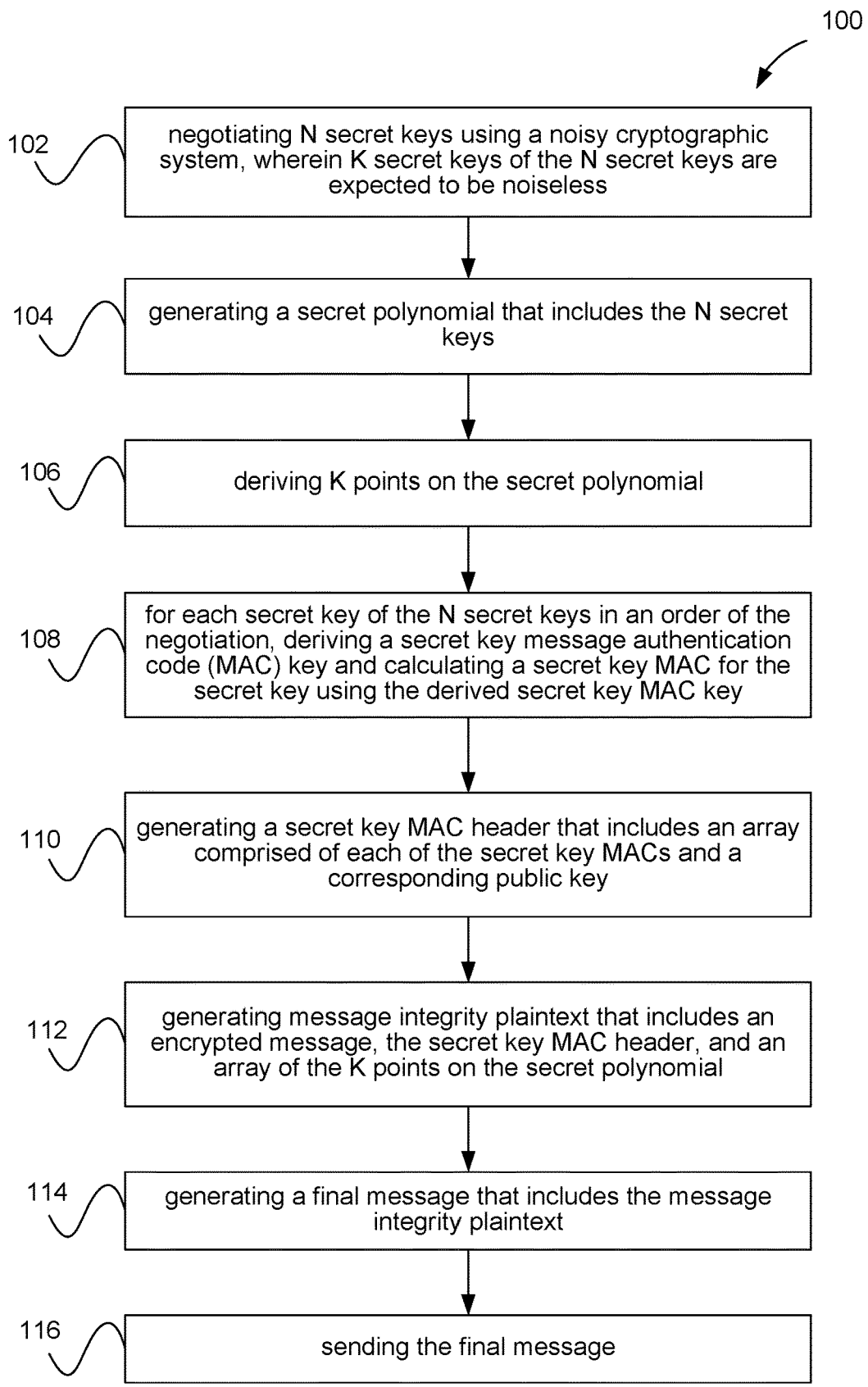
FIG. 1 shows a method for sending a message using a noisy cryptographic system, in accordance with one embodiment.

FIG. 1 shows a method 100 for sending a message using a noisy cryptographic system, in accordance with one embodiment. Accordingly, the method 100 may be performed by a message sender device.

As shown, in operation 102, N secret keys are negotiated using a noisy cryptographic system. In the context of the present description, the noisy cryptographic system includes any cryptographic system that introduces noise during key negotiation between a sender and receiver. In one embodiment, the noisy cryptographic system may negotiate bad (noisy) keys statistically significantly.

However, as shown in operation 102, K secret keys of the N secret keys are expected to be good (noiseless). In one embodiment, $0<K<N$. In another embodiment, $0<K<=N$. In one embodiment, N can be selected (e.g. predefined via the cryptographic system, etc.) such that the noisy cryptographic system produces at least K good secret keys. In general, since the noisy cryptographic system does not allow one to choose how many keys will happen to be noisy, parameters can be set in a way so that K keys are expected to be noiseless from a probability expected value point of view. In one embodiment, the cryptographic strength required for message transmission may be defined (e.g. predefined via the via the cryptographic system, etc.) to be t bits. In this embodiment, the N secret keys may provide t bit cryptographic strength.

In one embodiment, the N secret keys are negotiated with an intended message recipient device. In one embodiment, N ephemeral key pairs may initially be generated, and the N secret keys may then be negotiated using an ephemeral private key against a static public key of the intended message recipient.

Additionally, as shown in operation 104, a secret polynomial that includes the N secret keys is generated. In one embodiment, the secret polynomial is a Shamir secret polynomial (i.e. a secret polynomial generated using the Shamir polynomial-based secret sharing scheme). With respect to this embodiment, the N secret keys are coefficients of the secret polynomial. As an option, a key derivation function (KDF) is applied to each of the N secret keys to generate the coefficients of the secret polynomial, which may ensure that the coefficients are of a size required for the secret polynomial.

Further, as shown in operation 106, K points on the secret polynomial are derived. In one embodiment, the K points may be derived in a pseudo-random manner. Then, for each secret key of the N secret keys in an order of the negotiation, a secret key message authentication code (MAC) key is derived (e.g. using KDF) and a secret key MAC is calculated for the secret key using the derived secret key MAC key. Note operation 108. The secret key MACs may be generated for the purpose of being used by the intended message recipient to test validity of a corresponding secret key.

Still yet, as shown in operation 110, a secret key MAC header is generated that includes an array comprised of each of the secret key MACs and a corresponding public key. The corresponding public key may be the ephemeral public key of the ephemeral key pair corresponding to the secret key. In one embodiment, the secret key MAC header may be in the form shown in Table 1.

Table 1

Secret key MAC header={array of {secret key MAC,ephemeral public key}}

In operation 112, message integrity plaintext is generated which includes an encrypted message, the secret key MAC header, and an array of the K points on the secret polynomial. The encrypted message may be any message (e.g. text, content, etc.) desired to be sent by the message sender. In one embodiment, the encrypted message may be generated by encrypting a message with a message encryption key. In one embodiment, the message encryption key may be derived from all of the N secret keys (e.g. by applying a KDF to all of the N secret keys).

In one embodiment, the message integrity plaintext may be in the form shown in Table 2.

Table 2

Message integrity plaintext={encrypted message, secret key MAC header,array of K polynomial points}

As further shown, in operation 114, a final message is generated which includes the message integrity plaintext. In one embodiment, the final message may also include a message MAC. In one embodiment, the message MAC may be calculated on the message integrity plaintext using a message MAC key. In one embodiment, the message MAC key may be derived from all of the N secret keys (e.g. derived by applying a KDF to all of the N secret keys). In one embodiment, the final message may be in the form shown in Table 3.

Table 3

Final message={message integrity plaintext,message MAC}

Finally, as shown in operation 116, the final message is sent. In one embodiment, the final message may be sent for being transmitted to the intended message recipient. In one embodiment, the final message may be sent over a communication network for transmission to the intended message recipient.

Figure 2:
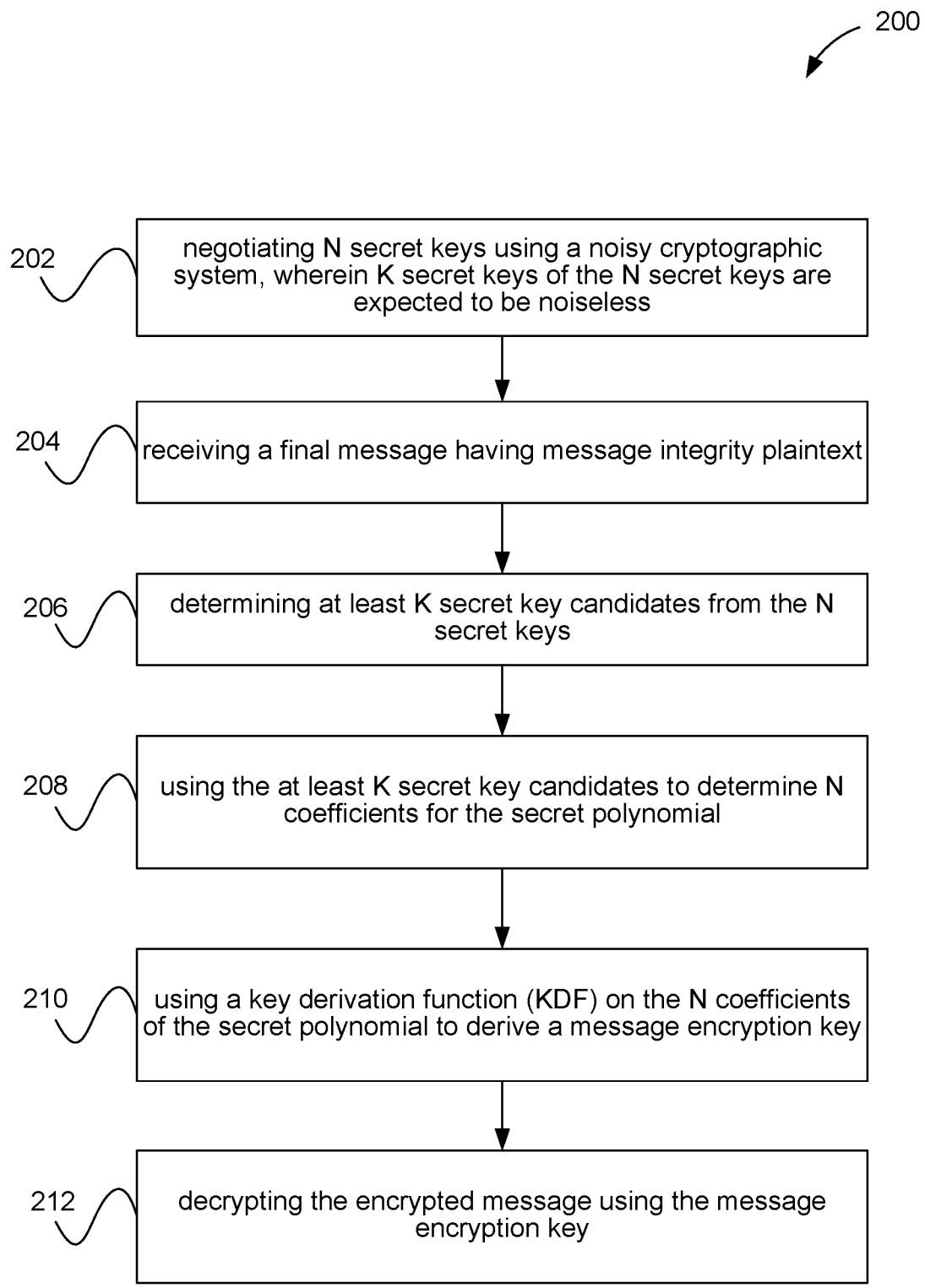
FIG. 2 shows a method for receiving a message using a noisy cryptographic system, in accordance with another embodiment.

FIG. 2 shows a method 200 for receiving a message using a noisy cryptographic system, in accordance with another embodiment. Accordingly, the method 200 may be performed by a message recipient device.

As shown, in operation 202, N secret keys are negotiated using a noisy cryptographic system. In the context of the present embodiment, the N secret keys may be those negotiated with the message sender as described above with reference to operation 102 of FIG. 1. For example, the N secret keys may be negotiated using a static private key of the message recipient against an ephemeral public key. In any case, K secret keys of the N secret keys are expected to be good (noiseless).

Additionally, as shown in operation 204, a final message having message integrity plaintext is received. In the context of the present embodiment, the message integrity plaintext includes an encrypted message, a secret key MAC header that includes an array comprised of a secret key MAC and a corresponding public key for each of the N secret keys, and an array of K points on a secret polynomial. In one embodiment, the final message may be the final message sent in operation 116 of FIG. 1.

As shown in operation 206, at least K secret key candidates are determined from the N secret keys. In the context of the present embodiment, the K or more secret key candidates refer to K or more of the N secret keys that are candidates for the K noiseless secret keys of the N secret keys. The K secret key candidates may be determined as a combination of at least K selected secret keys from the N secret keys. Thus, the secret key candidates may include K of the N secret keys or greater than K of the N secret keys.

In one embodiment, the at least K secret key candidates may be determined by analyzing each secret key of the N secret keys. In particular, a secret key MAC key may be derived using a KDF, a secret key MAC for the secret key may be calculated using the secret key MAC key, and the calculated secret key MAC may be compared to the secret key MAC included in the message integrity plaintext for the secret key. When the calculated secret key MAC matches the secret key MAC included in the message integrity plaintext for the secret key, the secret key may be added to a list of secret key candidates along with an order in which the secret key was negotiated. Once all of the N secret keys are analyzed, a length of the list may be verified to be at least K (i.e. to include at least K secret key candidates).

Still yet, as shown in operation 208, the at least K secret key candidates are used to determine N coefficients for the secret polynomial. In one embodiment, any combination of K of the secret key candidates may be used as the corresponding coefficients in the secret polynomial. In one embodiment, remaining coefficients of the secret polynomial may be obtained using the array of K points included in the message integrity plaintext.

In one embodiment, the at least K secret key candidates may be used to determine the N coefficients for the secret polynomial by: (a) selecting a combination of K secret key candidates from the list, (b) defining the secret polynomial with K coefficients as the selected K secret key candidates according to an order of the N secret keys, (c) using the array of K points to obtain K linear equations, (d) determining whether the K linear equations can be solved to obtain all N coefficients for the secret polynomial, and (e) returning to (a) to select a different combination of K secret key candidates from the list, responsive to determining in (d) that the K linear equations cannot be solved to obtain all N coefficients for the secret polynomial. Thus, (a)-(e) may be performed until the K linear equations can be solved to obtain all N coefficients for the secret polynomial.

Furthermore, as shown in operation 210, a KDF is used on the N coefficients of the secret polynomial to derive a message encryption key. Then, in operation 212, the encrypted message is decrypted using the message encryption key. As an option, the KDF may also be used on the N coefficients of the secret polynomial to derive a message MAC key. A message MAC may then be calculated on the message integrity plaintext, and the calculated message MAC may be verified to match a message MAC received with the final message. The encrypted message may optionally only be decrypted using the encryption key responsive to verifying that the computed message MAC matches the message MAC received with the final message (e.g. to eliminate false positives).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
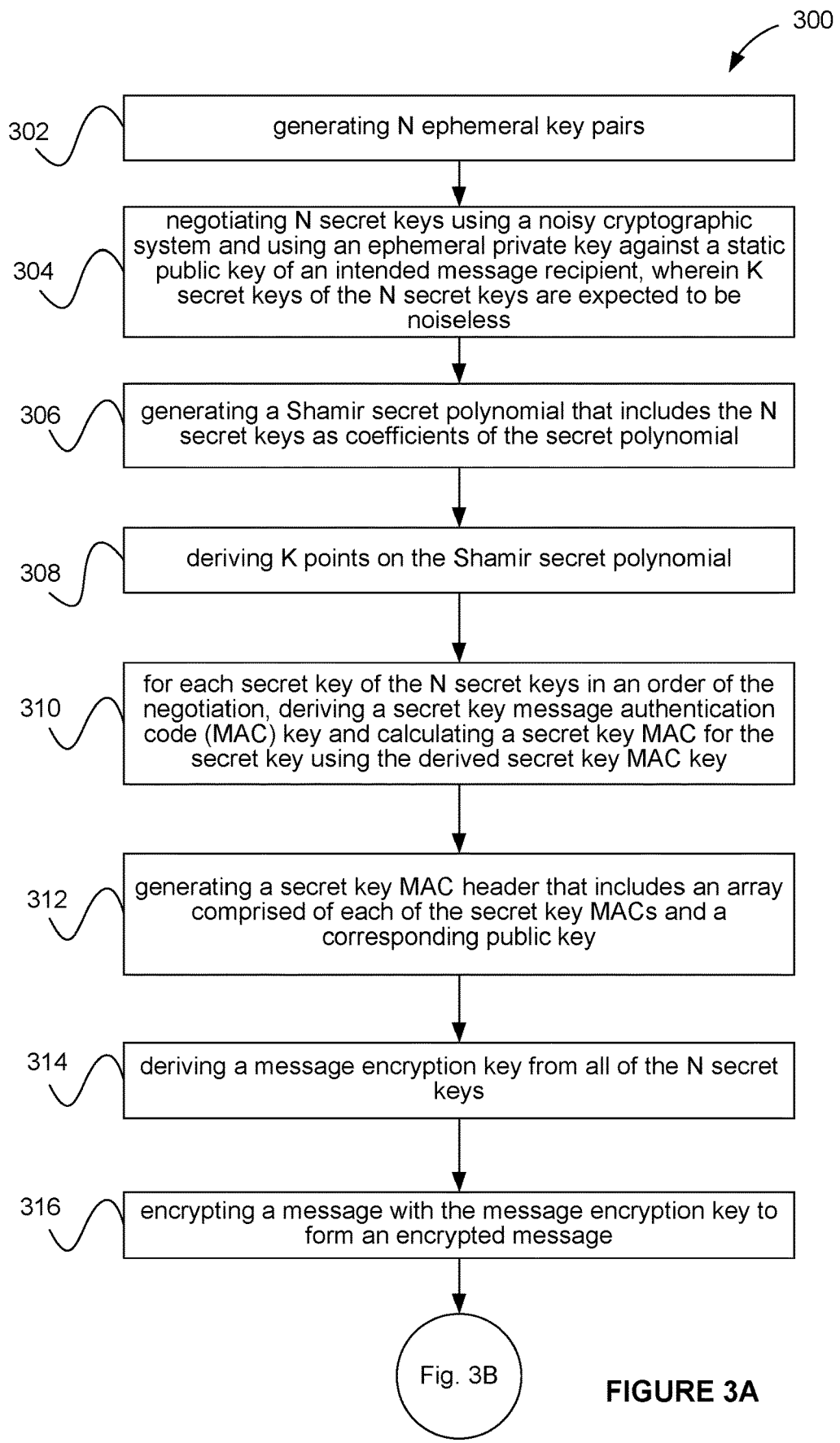
FIGS. 3A-B show a method for sending a message using a noisy cryptographic system, in accordance with another embodiment.
Figure 3B:
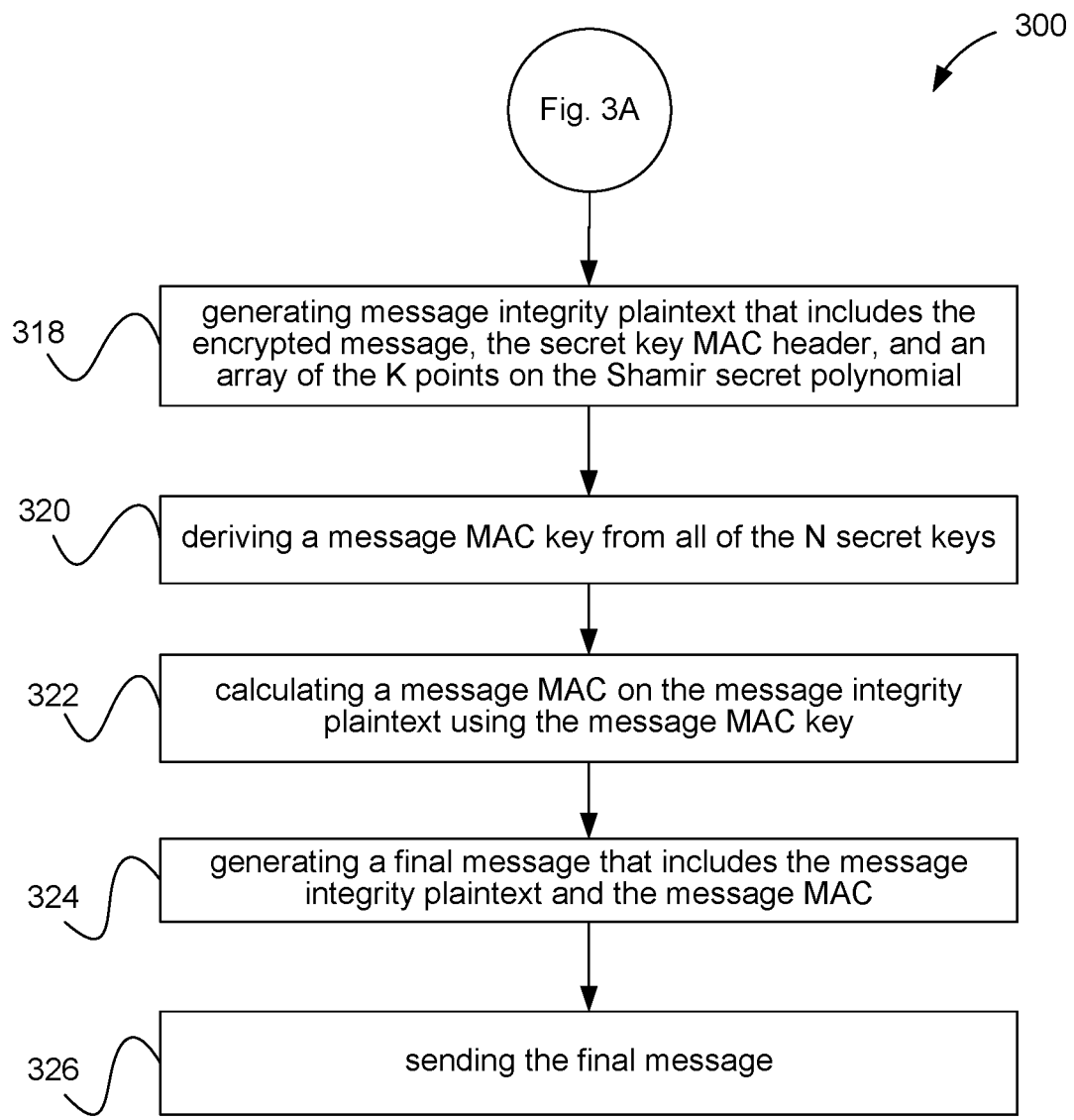

FIGS. 3A-B show a method 300 for sending a message using a noisy cryptographic system, in accordance with another embodiment. The method 300 may be performed in the context of the method 100 of FIG. 1, as an option.

As shown, in operation 302, N ephemeral key pairs are generated. In operation 304, N secret keys are negotiated using a noisy cryptographic system and using an ephemeral private key against a static public key of an intended message recipient, where K secret keys of the N secret keys are expected to be noiseless.

Additionally, in operation 306, a Shamir secret polynomial that includes the N secret keys as coefficients of the secret polynomial is generated, and, in operation 308, K points on the Shamir secret polynomial are derived (e.g. selected). Further, in operation 310, for each secret key of the N secret keys in an order of the negotiation, a secret key MAC key is derived (e.g. using a KDF) and a secret key MAC for the secret key is calculated using the derived secret key MAC key.

In operation 312, a secret key MAC header is generated which includes an array comprised of each of the secret key MACs and a corresponding public key. Moreover, in operation 314, a message encryption key is derived (e.g. using a KDF) from all of the N secret keys, and, in operation 316, a message is encrypted with the message encryption key to form an encrypted message.

Still yet, in operation 318, message integrity plaintext is generated which includes the encrypted message, the secret key MAC header, and an array of the K points on the Shamir secret polynomial. Then, in operation 320, a message MAC key is derived (e.g. using a KDF) from all of the N secret keys, and, in operation 322, a message MAC is calculated on the message integrity plaintext using the message MAC key.

Moreover, in operation 324, a final message is generated that includes the message integrity plaintext and the message MAC. In operation 326, the final message is sent (e.g. for transmission to the intended recipient).

Figure 4A:
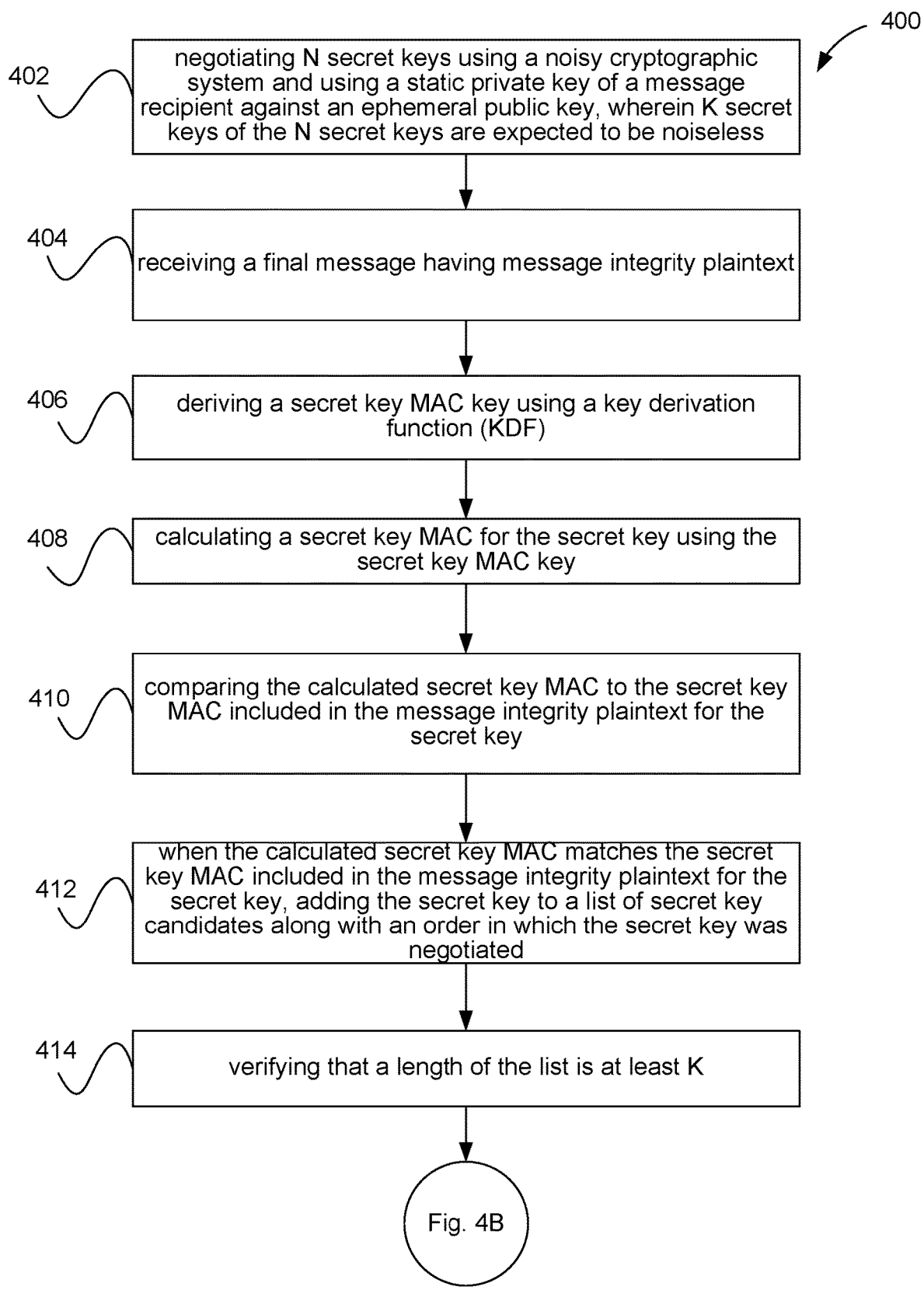
FIGS. 4A-B show a method for receiving a message using a noisy cryptographic system, in accordance with yet another embodiment.
Figure 4B:
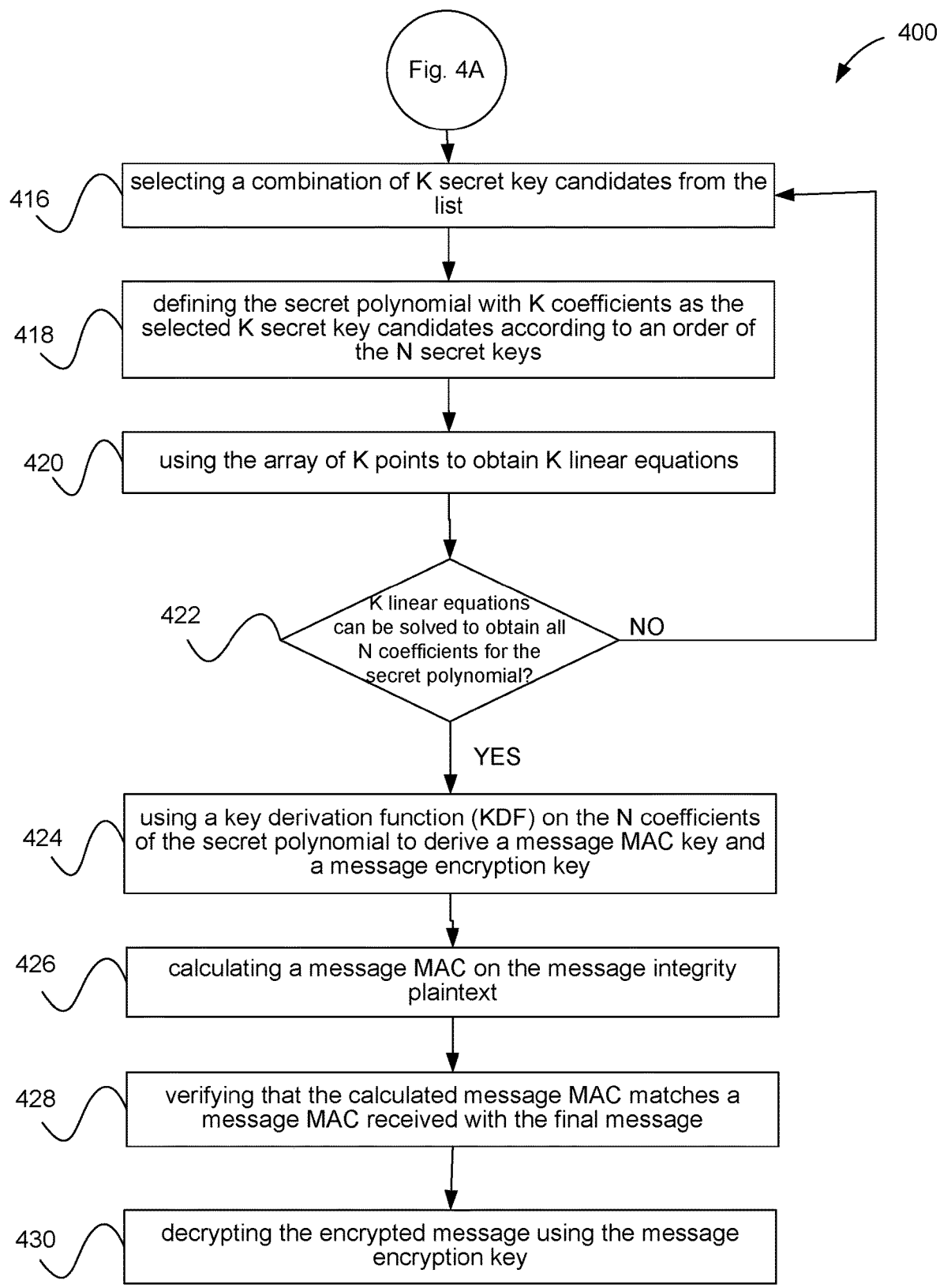

FIGS. 4A-B show a method 400 for receiving a message using a noisy cryptographic system, in accordance with yet another embodiment. The method 400 may be performed in the context of the method 200 of FIG. 2, as an option. As another option, the method 400 may be performed when receiving a message sent via the method 300 of FIGS. 3A-B.

As shown, in operation 402, N secret keys are negotiated using a noisy cryptographic system and using a static private key of a message recipient against an ephemeral public key, where K secret keys of the N secret keys are expected to be noiseless. Additionally, in operation 404, a final message having message integrity plaintext is received. In the context of the present embodiment, the message integrity plaintext includes an encrypted message, a secret key MAC header that includes an array comprised of a secret key MAC and a corresponding public key for each of the N secret keys, and an array of K points on a secret polynomial.

Further, in operations 406-414, at least K secret key candidates are determined from the N secret keys by analyzing each secret key of the N secret keys. In particular, in operation 406 a secret key MAC key is derived using a key derivation function (KDF). In operation 408, a secret key MAC is calculated for the secret key using the secret key MAC key. In operation 410, the calculated secret key MAC is compared to the secret key MAC included in the message integrity plaintext for the secret key. In operation 412, when the calculated secret key MAC matches the secret key MAC included in the message integrity plaintext for the secret key, the secret key is added to a list of secret key candidates along with an order in which the secret key was negotiated. In operation 414, a length of the list is verified to be at least K.

Once the at least K secret key candidates are determined from the N secret keys, the at least K secret key candidates are used in operations 416-422 to determine N coefficients for the secret polynomial. In particular, in operation 416, a combination of K secret key candidates are selected from the list. In operation 418, the secret polynomial is defined with K coefficients as the selected K secret key candidates according to an order of the N secret keys. In operation 420, the array of K points is used to obtain K linear equations. In decision 422, it is determined whether the K linear equations can be solved to obtain all N coefficients for the secret polynomial. If it is determined in operation 422 that the K linear equations cannot be solved to obtain all N coefficients for the secret polynomial, the method 400 returns to operation 416 to select a different combination of K secret key candidates from the list.

Once it is determined in operation 422 that the K linear equations can be solved to obtain all N coefficients for the secret polynomial, the method proceeds to operation 424 where a KDF is used on the N coefficients of the secret polynomial to derive a message MAC key and a message encryption key. Then, in operation 426, a message MAC is calculated on the message integrity plaintext (e.g. using the message MAC key), and, in operation 428, the calculated message MAC is verified as matching a message MAC received with the final message.

When the calculated message MAC matches the message MAC received with the final message, then the N secret keys negotiated on the message sender's device has been retrieved correctly by the message recipient in an error-free manner. Accordingly, responsive to verifying that the computed message MAC matches the message MAC received with the final message, in operation 430 the encrypted message is decrypted using the message encryption key. However, if the calculated message MAC is not verified to match the message MAC received with the final message, the message may be rejected (not shown).

The embodiments described with reference to the Figures above may require a message size overhead as follows. With N secret keys and K points, each secret key requires an ephemeral key and secret key MAC to be sent. Thus, this overhead is equal to the ephemeral key length (EKL) plus t-bits per secret key. Furthermore, each point has 2 t-bit coordinates, providing overhead of 2t-bits per point. The total overhead then is (EKL+t)*N+2t (K) bits.

It should be noted that cryptographic strength when suing the Shamir polynomial as described above is log(K)+t-bit cryptographic strength. This is because each secret key needs to be brute-forced against the secret key MAC and K noiseless secret key candidates are required to retrieve the Shamir polynomial. Further, the cryptographic strength may be directly proportional to the minimum strength out of the secret key validation and Shamir polynomial scheme.

Figure 5:
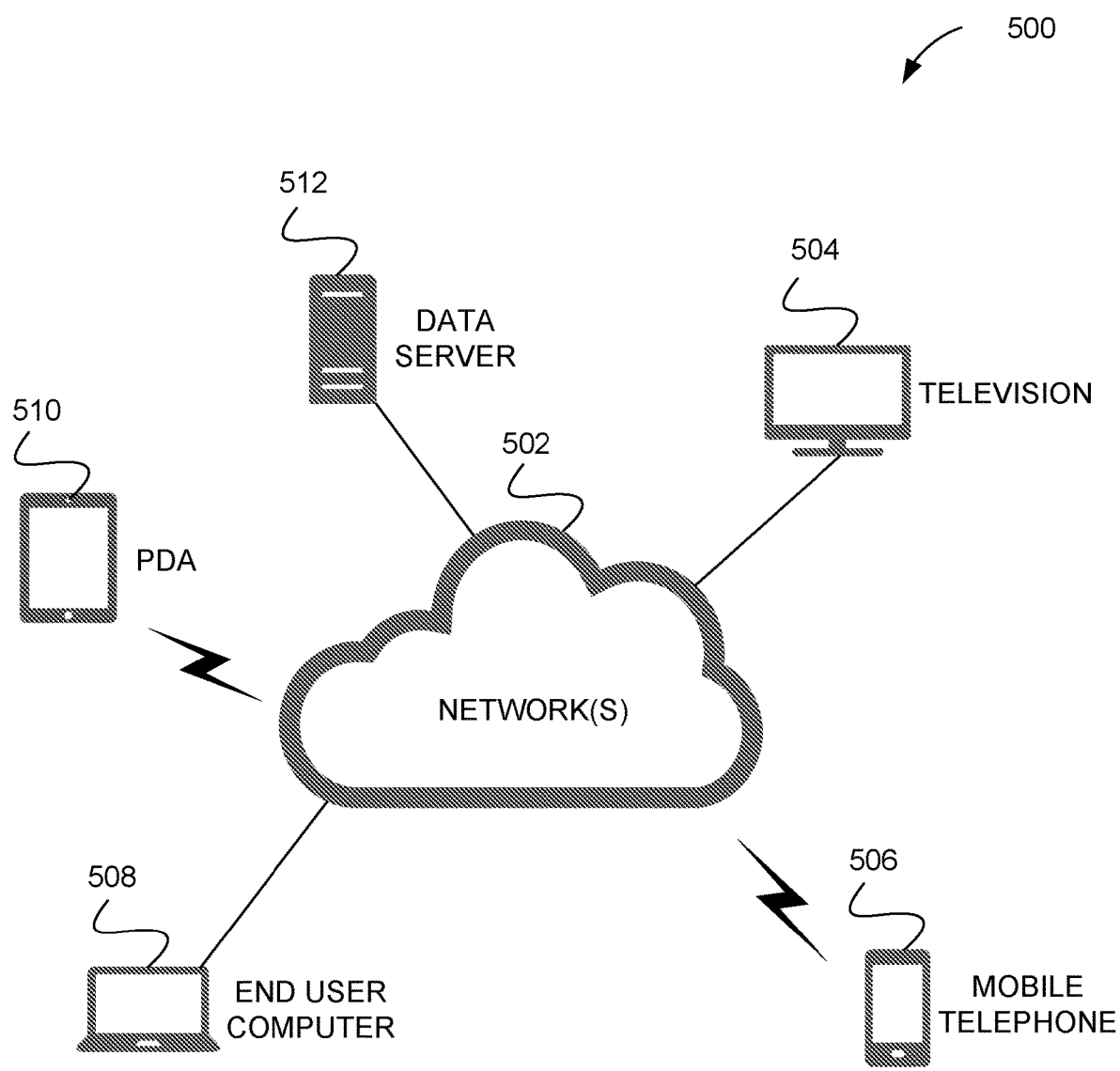
FIG. 5 illustrates a network architecture, in accordance with one embodiment.

FIG. 5 illustrates a network architecture 500, in accordance with one embodiment. As shown, at least one network 502 is provided. In various embodiments, any one or more components/features set forth during the description of any previous figure(s) may be implemented in connection with any one or more of the components of the at least one network 502.

In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
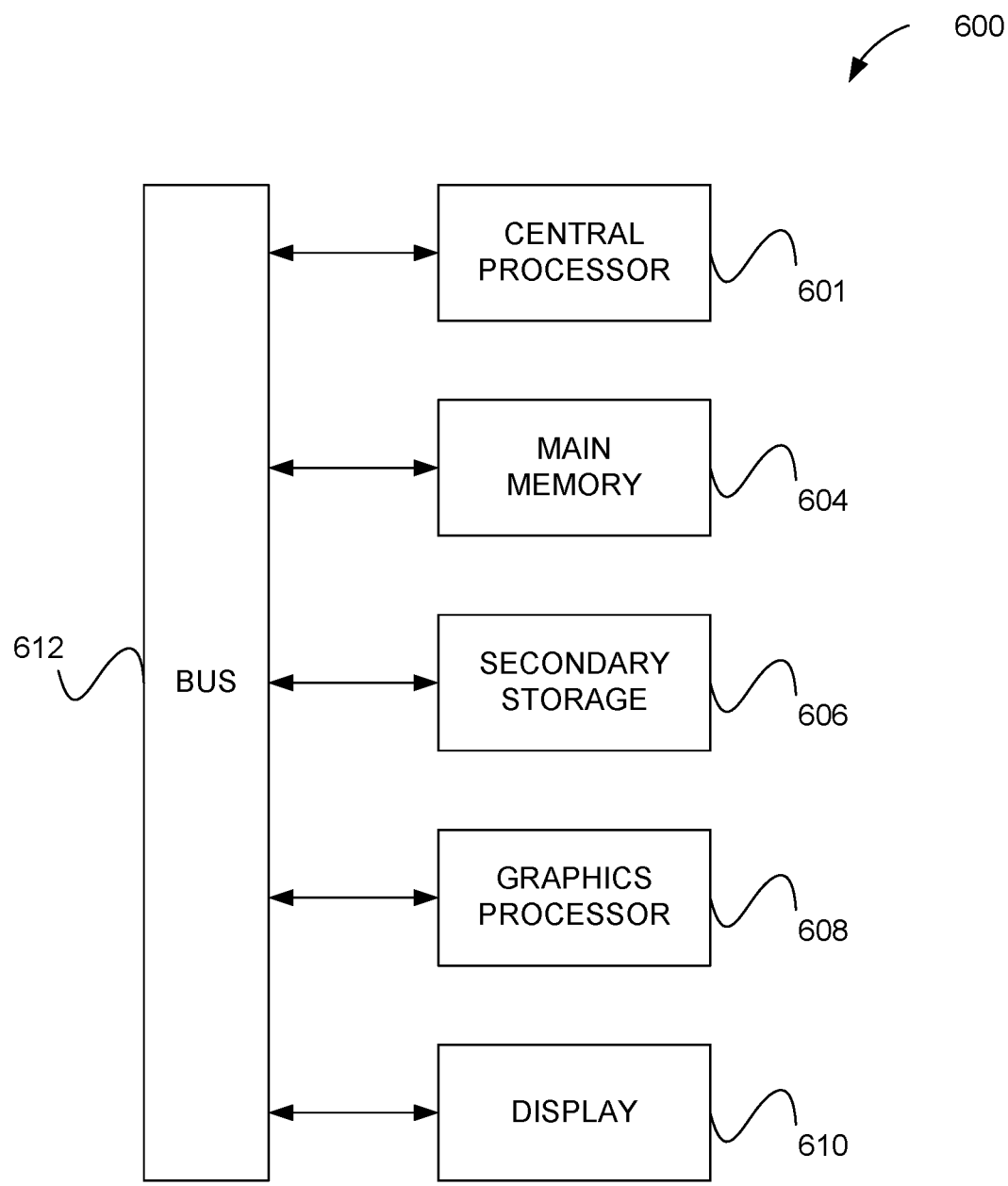
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 602 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

In one embodiment, means in the form of the processor 602 (and/or different means corresponding to different components thereof) executes instructions in the memory 604 or in the secondary storage 606 to send a message using a noisy cryptographic system including to: negotiate N secret keys using a noisy cryptographic system, wherein K secret keys of the N secret keys are noiseless; generate a secret polynomial that includes the N secret keys; derive K points on the secret polynomial; for each secret key of the N secret keys in an order of the negotiation, derive a secret key message authentication code (MAC) key and calculate a secret key MAC for the secret key using the derived secret key MAC key; generate a secret key MAC header that includes an array comprised of each of the secret key MACs and a corresponding public key; generate message integrity plaintext that includes an encrypted message, the secret key MAC header, and an array of the K points on the secret polynomial; generate a final message that includes the message integrity plaintext; and send the final message.

Optionally, in any of the preceding embodiments, N ephemeral key pairs are further generated. As a further option, the N secret keys are negotiated using an ephemeral private key against a static public key of an intended message recipient.

Optionally, in any of the preceding embodiments, the secret polynomial is a Shamir secret polynomial. As a further option, the N secret keys are coefficients of the secret polynomial. As a further option, a key derivation function (KDF) is applied to each of the N secret keys to generate the coefficients of the secret polynomial.

Optionally, in any of the preceding embodiments, the encrypted message is generated by encrypting a message with a message encryption key. As a further option, the message encryption key is derived from all of the N secret keys. As a further option, the message encryption key is derived by applying a key derivation function (KDF) to all of the N secret keys.

Optionally, in any of the preceding embodiments, the final message further includes a message MAC. As a further option, the message MAC is calculated on the message integrity plaintext using a message MAC key. As a further option, the message MAC key is derived from all of the N secret keys. As a further option, the message MAC key is derived by applying a key derivation function (KDF) to all of the N secret keys.

Optionally, in any of the preceding embodiments, the processor 602 (and/or different means corresponding to different components thereof) executes the instructions in the memory 604 or in the secondary storage 606 to receive a message using a noisy cryptographic system including to: negotiate N secret keys using a noisy cryptographic system, wherein K secret keys of the N secret keys are noiseless; receive a final message having message integrity plaintext, the message integrity plaintext including: an encrypted message, a secret key MAC header that includes an array comprised of a secret key MAC and a corresponding public key for each of the N secret keys, and an array of K points on a secret polynomial; determine at least K secret key candidates from the N secret keys; use the at least K secret key candidates to determine N coefficients for the secret polynomial; use a key derivation function (KDF) on the N coefficients of the secret polynomial to derive a message encryption key; and decrypt the encrypted message using the message encryption key.

Optionally, in any of the preceding embodiments, the N secret keys are negotiated using a static private key of a recipient of the final message against an ephemeral public key.

Optionally, in any of the preceding embodiments, determining at least K secret key candidates from the N secret keys includes, for each secret key of the N secret keys: deriving a secret key MAC key using a key derivation function (KDF), calculating a secret key MAC for the secret key using the secret key MAC key, comparing the calculated secret key MAC to the secret key MAC included in the message integrity plaintext for the secret key, when the calculated secret key MAC matches the secret key MAC included in the message integrity plaintext for the secret key, adding the secret key to a list of secret key candidates along with an order in which the secret key was negotiated, and verifying that a length of the list is at least K. As a further option, using the at least K secret key candidates to determine N coefficients for the secret polynomial includes: (a) selecting a combination of K secret key candidates from the list; (b) defining the secret polynomial with K coefficients as the selected K secret key candidates according to an order of the N secret keys; (c) using the array of K points to obtain K linear equations; (d) determining whether the K linear equations can be solved to obtain all N coefficients for the secret polynomial; (e) returning to (a) to select a different combination of K secret key candidates from the list, responsive to determining in (d) that the K linear equations cannot be solved to obtain all N coefficients for the secret polynomial.

Optionally, in any of the preceding embodiments, the KDF is used on the N coefficients of the secret polynomial to derive a message MAC key, a message MAC is calculated on the message integrity plaintext; the calculated message MAC is verified to match a message MAC received with the final message; and the encrypted message is decrypted using the encryption key responsive to verifying that the computed message MAC matches the message MAC received with the final message.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for sending a message using a noisy cryptographic system, comprising:
negotiating N secret keys using a noisy cryptographic system, wherein K secret keys of the N secret keys are expected to be noiseless;
generating a secret polynomial that includes the N secret keys;
deriving K points on the secret polynomial;
for each secret key of the N secret keys in an order of the negotiation, deriving a secret key message authentication code (MAC) key and calculating a secret key MAC for the secret key using the derived secret key MAC key;
generating a secret key MAC header that includes an array comprised of each of the secret key MACs and a corresponding public key;
generating message integrity plaintext that includes an encrypted message, the secret key MAC header, and an array of the K points on the secret polynomial;
generating a final message that includes the message integrity plaintext; and
sending the final message.

2. The method of claim 1, further comprising:
generating N ephemeral key pairs.

3. The method of claim 2, wherein the N secret keys are negotiated using an ephemeral private key against a static public key of an intended message recipient.

4. The method of claim 1, wherein the secret polynomial is a Shamir secret polynomial.

5. The method of claim 4, wherein the N secret keys are coefficients of the secret polynomial.

6. The method of claim 5, wherein a key derivation function (KDF) is applied to each of the N secret keys to generate the coefficients of the secret polynomial.

7. The method of claim 1, wherein the encrypted message is generated by:
encrypting a message with a message encryption key.

8. The method of claim 7, wherein the message encryption key is derived from all of the N secret keys.

9. The method of claim 8, wherein the message encryption key is derived by applying a key derivation function (KDF) to all of the N secret keys.

10. The method of claim 1, wherein the final message further includes a message MAC.

11. The method of claim 10, wherein the message MAC is calculated on the message integrity plaintext using a message MAC key.

12. The method of claim 11, wherein the message MAC key is derived from all of the N secret keys.

13. The method of claim 12, wherein the message MAC key is derived by applying a key derivation function (KDF) to all of the N secret keys.

14. A non-transitory computer readable medium storing computer code executable by a processor to perform a method comprising:
negotiating N secret keys using a noisy cryptographic system, wherein K secret keys of the N secret keys are expected to be noiseless;
generating a secret polynomial that includes the N secret keys;
deriving K points on the secret polynomial;
for each secret key of the N secret keys in an order of the negotiation, deriving a secret key message authentication code (MAC) key and calculating a secret key MAC for the secret key using the derived secret key MAC key;
generating a secret key MAC header that includes an array comprised of each of the secret key MACs and a corresponding public key;
generating message integrity plaintext that includes an encrypted message, the secret key MAC header, and an array of the K points on the secret polynomial;
generating a final message that includes the message integrity plaintext; and
sending the final message.

15. An apparatus, comprising:
a memory storing instructions, and
a computer processor executing the instructions to perform a method comprising:
negotiating N secret keys using a noisy cryptographic system, wherein K secret keys of the N secret keys are expected to be noiseless;
generating a secret polynomial that includes the N secret keys;
deriving K points on the secret polynomial;
for each secret key of the N secret keys in an order of the negotiation, deriving a secret key message authentication code (MAC) key and calculating a secret key MAC for the secret key using the derived secret key MAC key;

generating a secret key MAC header that includes an array comprised of each of the secret key MACs and a corresponding public key;

generating message integrity plaintext that includes an encrypted message, the secret key MAC header, and an array of the K points on the secret polynomial;

generating a final message that includes the message integrity plaintext; and sending the final message.

16. A method for receiving a message using a noisy cryptographic system, comprising:

negotiating N secret keys using a noisy cryptographic system, wherein K secret keys of the N secret keys are expected to be noiseless;

receiving a final message having message integrity plaintext, the message integrity plaintext including:
  an encrypted message,
  a secret key MAC header that includes an array comprised of a secret key MAC and a corresponding public key for each of the N secret keys, and
  an array of K points on a secret polynomial;

determining at least K secret key candidates from the N secret keys;

using the at least K secret key candidates to determine N coefficients for the secret polynomial;

using a key derivation function (KDF) on the N coefficients of the secret polynomial to derive a message encryption key; and decrypting the encrypted message using the message encryption key.

17. The method of claim 16, wherein the N secret keys are negotiated using a static private key of a recipient of the final message against an ephemeral public key.

18. The method of claim 16, wherein determining at least K secret key candidates from the N secret keys includes, for each secret key of the N secret keys:

deriving a secret key MAC key using a key derivation function (KDF), calculating a secret key MAC for the secret key using the secret key MAC key, comparing the calculated secret key MAC to the secret key MAC included in the message integrity plaintext for the secret key, when the calculated secret key MAC matches the secret key MAC included in the message integrity plaintext for the secret key, adding the secret key to a list of secret key candidates along with an order in which the secret key was negotiated, and verifying that a length of the list is at least K.

19. The method of claim 18, wherein using the at least K secret key candidates to determine N coefficients for the secret polynomial includes:

(a) selecting a combination of K secret key candidates from the list;

(b) defining the secret polynomial with K coefficients as the selected K secret key candidates according to an order of the N secret keys;

(c) using the array of K points to obtain K linear equations;

(d) determining whether the K linear equations can be solved to obtain all N coefficients for the secret polynomial;

(e) returning to (a) to select a different combination of K secret key candidates from the list, responsive to determining in (d) that the K linear equations cannot be solved to obtain all N coefficients for the secret polynomial.

20. The method of claim 16, further comprising:

using the key derivation function (KDF) on the N coefficients of the secret polynomial to derive a message MAC key;

calculating a message MAC on the message integrity plaintext;

verifying that the calculated message MAC matches a message MAC received with the final message;

wherein the encrypted message is decrypted using the encryption key responsive to verifying that the computed message MAC matches the message MAC received with the final message.

* * * * *